Figure 1:
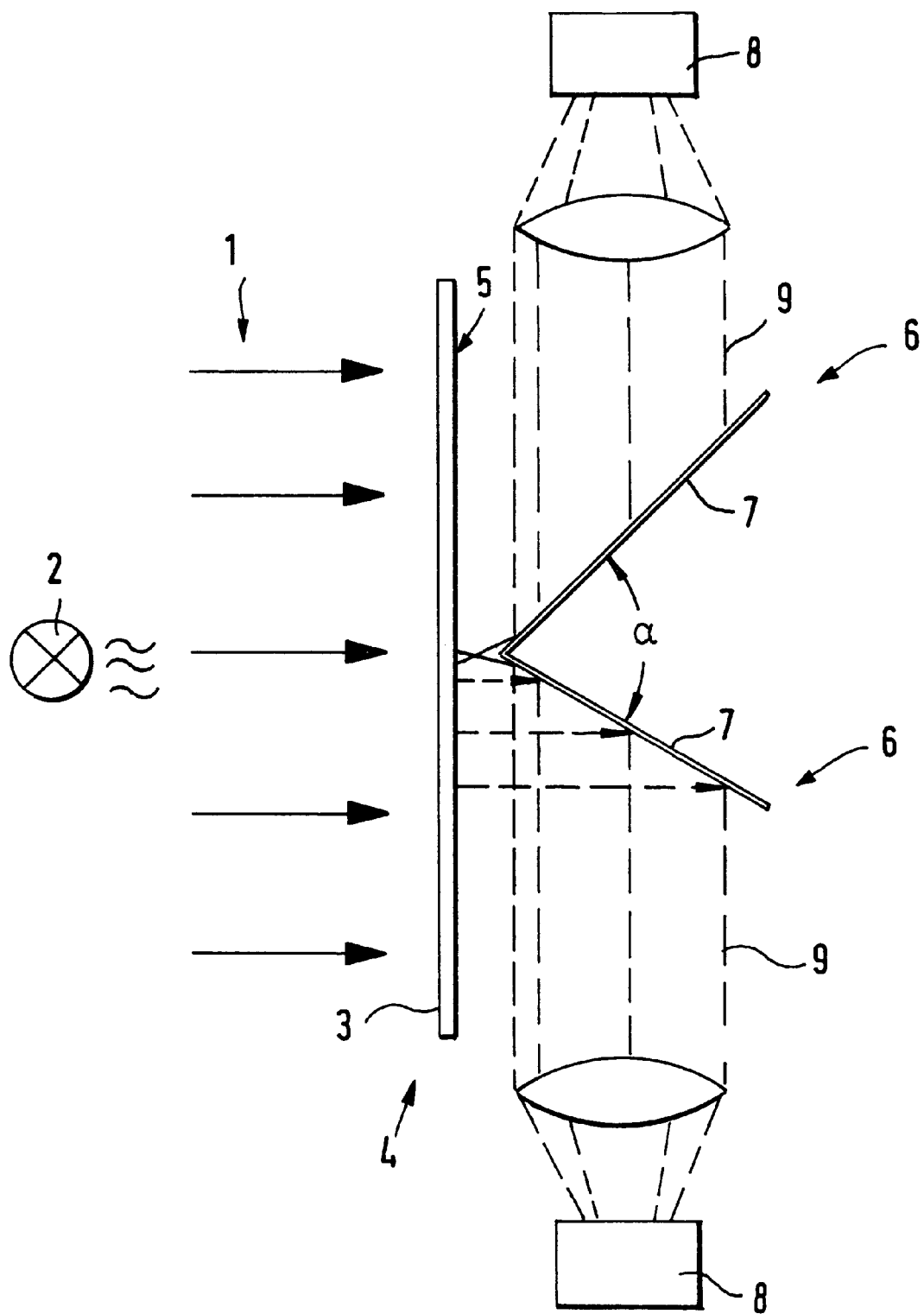

United States Patent [19]
Wägli et al.

[11] Patent Number: 6,038,286
[45] Date of Patent: Mar. 14, 2000

[54] OPTICAL ARRANGEMENT AND METHOD FOR ELECTRONICALLY DETECTING AN X-RAY IMAGE

[75] Inventors: Peter Wägli, Bremgarten; Ruedi G. Laupper, Hitzkirch, both of Switzerland

[73] Assignee: Teleray AG, Hitzkirch, Switzerland

[21] Appl. No.: 09/068,570

[22] PCT Filed: Nov. 19, 1996

[86] PCT No.: PCT/CH96/00410

§ 371 Date: May 22, 1998

§ 102(e) Date: May 22, 1998

[87] PCT Pub. No.: WO97/20231

PCT Pub. Date: Jun. 5, 1997

[30]     Foreign Application Priority Data

Nov. 24, 1995  [CH]  Switzerland ............... 3330/95

[51] Int. Cl.[7] .................................................. H05G 1/64
[52] U.S. Cl. ..................................... 378/98.3; 378/98.12
[58] Field of Search .................. 378/98.3, 98.12

[56]           References Cited

U.S. PATENT DOCUMENTS 4,503,460  3/1985  Sklebitz .................. 378/98.3
5,550,380  8/1996  Sugawara .................. 378/98.3

FOREIGN PATENT DOCUMENTS 373 717   6/1990   European Pat. Off. .

OTHER PUBLICATIONS

IEEE Article "Segmented Array Reconstructions for Tomographic Imaging of Large Objects: Theory and an Application to Neutron Computed Tomography" pp. 1275–1281 Aug. 1993, New York.

*Primary Examiner*—Craig E. Church
*Attorney, Agent, or Firm*—Shoemaker and Mattare, Ltd.

[57]              ABSTRACT

The invention concerns an arrangement for electronically detecting an X-ray image, the arrangement comprising a converter (4), in particular a scintillation foil (3). A visible image is generated on the display surface (5) of the scintillation foil (3) by X-rays. At least two mirrors (7) are provided which produce images of segments of the display surface (5). In addition, electronic camera systems (8) are provided for converting the image segments reflected by the mirror (7) into electrical signals. The beam path (9) between the camera systems (8) and mirrors (7) is approximately parallel to the display surface (5).

7 Claims, 3 Drawing Sheets

OPTICAL ARRANGEMENT AND METHOD FOR ELECTRONICALLY DETECTING AN X-RAY IMAGE

The invention relates to an arrangement for the electronic acquisition of an X-ray picture as well as a method for acquiring a visible picture which is produced by way of X-ray beams on the surface of a converter.

X-ray pictures in the region of visible light are traditionally produced on surfaces which convert the X-ray beams modulated by the object, which is irradiated, into visible light. Generally for this scintillation foils are widely applied. Such foils e.g. contain caesium iodide. Alternatively other primary picture arrangements such as e.g. coated glass or coated plastic sheets are conceivable.

For television transmission of X-ray pictures also television cameras have already been applied. With this an X-ray image intensifier is used, which receives the X-ray beams modulated by the irradiated object and transmits an intensified output picture onto the projection surface of a television camera via an objective of great light transmitting capacity. The television camera delivers electrical signals which in the monitor are converted back into the irradiation picture. The image intensifier at the same time consists of an evacuated tube on whose end face there is located an X-ray luminescent screen as a primary picture arrangement. Directly behind this there is located the photocathode from which electrons exit after the incidence of light, whose number is proportional to the excitation of the luminescent screen by way of the X-ray beams. The image intensification arises by way of the fact that the emitted photoelectrons are accelerated by an electrical field and excite the opposite output luminescent screen to irradiate intensified several times. The output picture may be transmitted to the input optics of the television receiver tube in many ways. For example there are known electrostatic imagings, with which the picture on the input window is electron-optically reduced onto the output window and is thus adapted to the window of the camera. The picture may also be transmitted by an optical lens arrangement with which the output picture of the image intensifier is located in the focal plane of the first objective, wherein the picture is produced in the focal plane of the camera objective. Instead of the optical transmission the picture may be transmitted from the output side of the image intensifier also by way of a fibre-optic to the input optics of the television camera.

Such television systems are extraordinarily complicated, require specially adapted X-ray apparatus and on account of the large requirement of space cannot be integrated into standard X-ray apparatus.

In practice therefore mostly laser-image systems are applied in order to convert X-ray pictures into electrical signals and to store, transmit or process the picture signals in another manner. With laser-image systems primarily memory foils are applied which store the modulated X-ray radiation in a metastable condition. The foils are excited to irradiate by an HeNe-laser. By way of this the signal may be electro-optically converted. Alternatively also conventionally exposed films may be "scanned". With this therefore the primary picture is produced on the foil or the film, this made possible by using conventional film cassettes ("Bucky's"). On the other hand with such arrangements no on-line transmission is possible, but for conversion a separate scanning procedure is required.

It is the object of the invention to provide an arrangement and a method, which permit the on-line acquisition and transmission as well as the representation of X-ray pictures in an economically simple manner and also permit the subsequent equipping of conventional X-ray apparatus.

This object is achieved according to the characterising part of the patent claims.

By way of the arrangement of two or more mirrors, on the one hand the picture may be divided into segments, this permitting the miniaturisation of the optical systems. Evidently by way of this also the deflecting arrangements, in particular mirrors, are reduced in size in that they only need to acquire individual segments of the picture.

Furthermore by way of the deflection it is achieved that the beam path runs parallel to the surface of the converter by which means the camera systems may be arranged laterally of the converter. This in turn reduces the constructional height of the arrangement such that the arrangement according to the invention may be incorporated into conventional film cassettes. As a deflecting arrangement conventional mirrors as well as also prisms or other optical deflecting systems are suitable. On the application of a prism it is also conceivable e.g. to co-integrate lens systems. If the mirror or the deflecting arrangement is arranged roughly V-shaped to an axis of the imaging surface, there results a picture separation. At the same time it is useful when the two picture segments, thus picture halves, slightly overlap so that no picture information is lost. This may be achieved e.g. in that the two mirrors are arranged at an angle of somewhat more than 90° to one another. Also the application of arcuate mirror surfaces with a corresponding electronic or optical restitution with the subsequent processing is conceivable.

As camera systems CCD cameras are particularly suitable, these permitting a miniaturisation of the whole arrangement.

The processing of the electronic pictures produced by the camera systems belongs to the state of the art. Thus today systems are available on the market with which the pictures of differing cameras mix with one another or can be combined again to a complete picture. At the same time the camera systems must not necessarily be arranged directly in the beam path of the deflecting arrangement. Of course also a multiple deflection or the intermediate arrangement of fiber-optic arrangements, image intensifiers and other optical and/or electronic processing means is possible.

Furthermore it is also possible to laterally replaceably attach the camera systems to a film cassette provided with deflecting mirrors in a releasable or exchangeable manner. By way of this on the one hand the relatively expensive camera system may be used for a multitude of film cassettes. On the other hand the maintenance and repair is in this manner more simple.

The processing of the electronic picture signals in a computer installation may e.g. be provided such that the signals joined together to the secondary picture are transmitted further to a terminal or to several terminals. The signals may also be stored or secondary pictures may be outputted as a hard copy, e.g. via a plotter.

Figure 2:
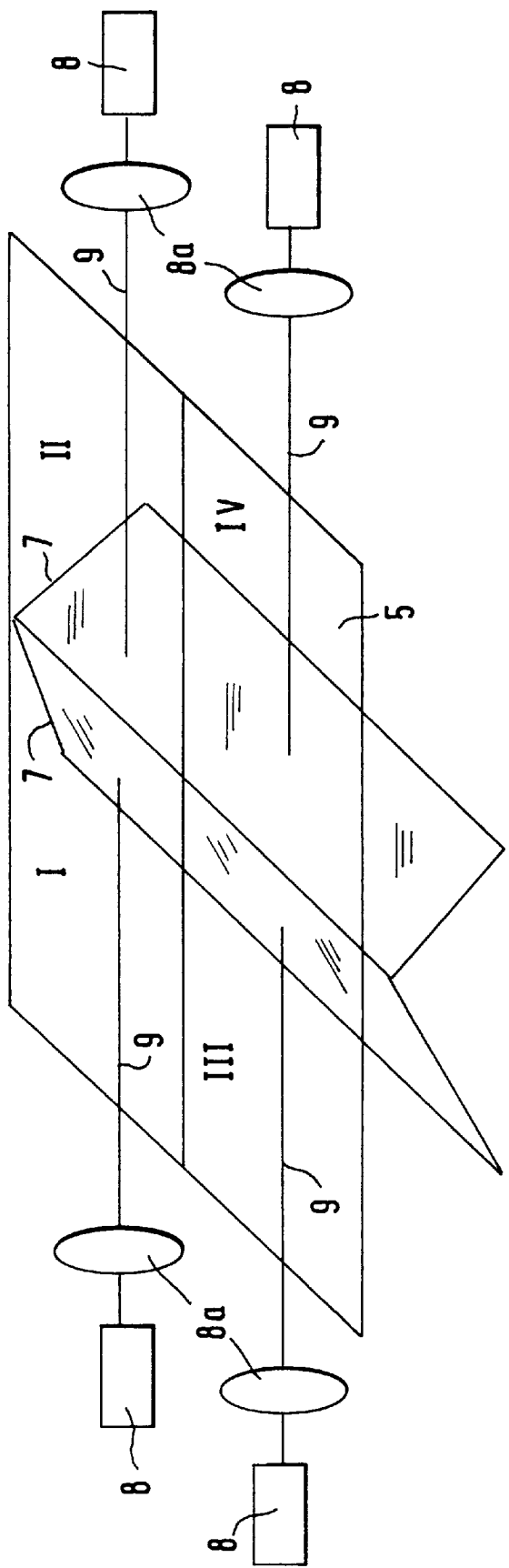
Figure 3:
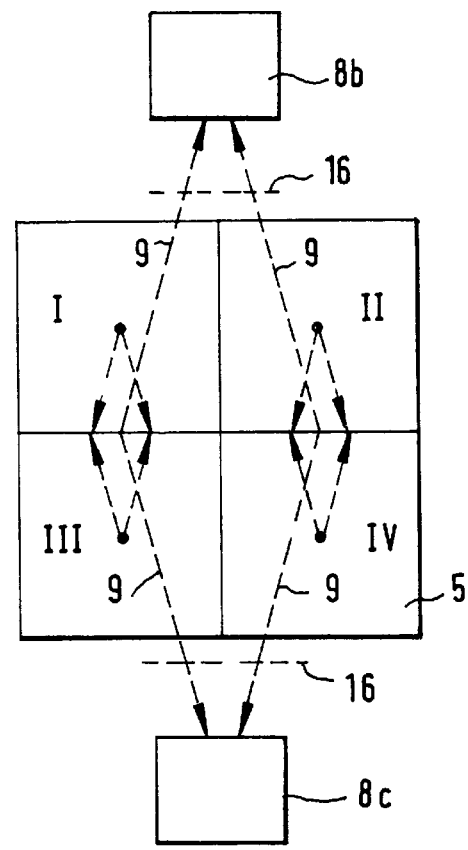
Figure 4:
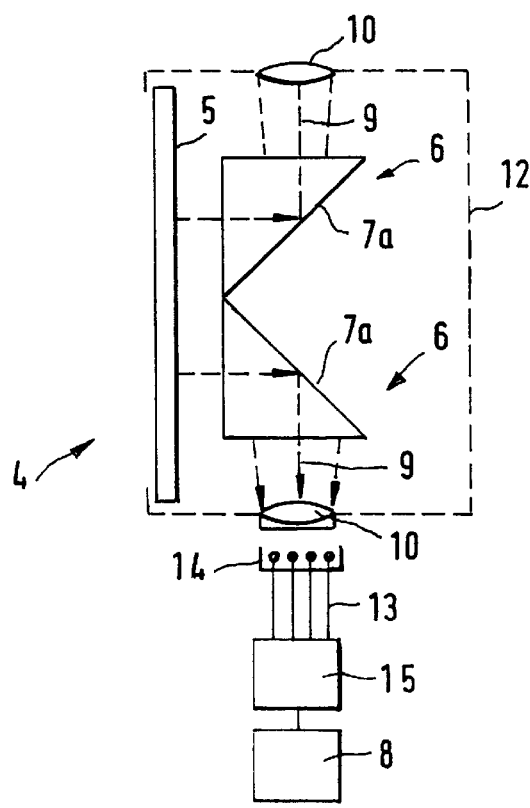

The invention is hereinafter described in more detail in embodiment examples by way of the drawings: There are shown:

FIG. 1 the schematic representation of an arrangement according to the invention for the electronic acquisition of an X-ray picture, in a lateral view, FIG. 2 the arrangement according to FIG. 1 in a perspective representation, FIG. 3 a modified embodiment example with two camera systems and FIG. 4 a further modified embodiment example of the invention.

According to FIG. 1 in the beam path 1 of an X-ray tube 2 there is arranged a scintillation foil 3 which is provided as a converter 4 for converting the X-ray beams modulated by the irradiated object into visible light. On the imaging surface 5 there thus arises a picture which is acquired by two deflecting arrangements 6 and is imaged such that it can be recorded by camera systems 8. With this the deflecting arrangements are designed as mirrors 7 arranged V-shaped to one another. The mirrors are arranged at an angle α to one another which is somewhat larger than 90°. The two mirrors 7 thus acquire somewhat more than only the half of the picture represented on the imaging surface 5 so that picture losses are securely avoided.

The optical beam path 9 between the mirrors 7 and the camera systems 8 at the same time runs roughly parallel to the imaging surface 5 so that the camera systems 8 may be arranged next to the converter 4. With this the thickness of the whole construction is minimised.

FIG. 2 shows the arrangement according to FIG. 1. As is shown the picture reflected by a mirror 7 is in each case acquired by two separate CCD cameras 8. The picture produced on the imaging surface 5 of the scintillation foil 3 (FIG. 1) is accordingly "broken down" into four individual segments I, II, III, IV. By way of the application of two mirrors and the arrangement of four camera systems the height of the whole construction may be particularly optimally minimised. Above all also the optics 8a (lens systems) allocated to the camera systems 8 are minimised in size. In practice objectives with a high aperture number (F is equal to or smaller than 1.0) have proven themselves as lens systems 8a, these objectives acquiring four segments and imaging them on a CCD chip. With this, CCD chips with a format of 1024×1280 pixels are particularly suitable. As a result pictures with an adequate resolution may be produced, wherein the normal format corresponds to the representation 35×43 cm. The adding together of the electronic picture signals produced by the CCD cameras 8 into a complete picture may be effected in any manner in a picture mixer arrangement.

FIG. 3 shows an embodiment example in which the four picture segments I, II, III, and IV in each case are mirrored in pairs, wherein the picture segments I and II are deflected into a first camera system 8b and the picture segments III and IV are deflected into a second camera system 8c. With this arrangement a CCD camera with a correspondingly adapted format is required. Alternatively also in the beam paths 9 interrupters 16 may be arranged, these alternately admitting light beams from one of the segments I or II and II or IV. Such a sequential picture processing requires much effort on mixing, but however reduces the costs for the CCD camera. Such picture interruption may also be achieved in electronic image intensifiers which may be part of the CCD camera. Accordingly in each case an image intensifier could be allocated to each of the beam paths I, II, III and IV, wherein then the image intensifiers in pairs are each optically connected to a CCD camera. Such an arrangement with an image intensifier and a CCD camera is schematically shown in FIG. 4. With this embodiment example the picture represented on the imaging surface 5 of a converter 4 is acquired by two prisms 7a. The light beams reflected by the prisms (beam path 9) are concentrated by lenses 10. The prisms 7a as well as the lenses 10 together with the converter 4 are accommodated in a schematically indicated housing 12. Laterally on the housing 12 fiber-optics 13 may be mounted in a conventional manner by way of plug connections 14 such that they assume the picture segment focused by the lenses 12 and lead it to an image intensifier 15. The image intensifier 15 is connected to a CCD camera which converts the acquired picture into electronic signals.

Evidently at the same time analogously to the embodiment example according to FIG. 2, four lenses 10 may correspondingly cooperate with prisms 7a in order to divide the imaging surface into four segments I, II, III, IV. Accordingly also four plugs 14 and four image intensifiers 15 as well as four camera systems 8 must be provided.

With this, the invention is of course neither limited to CCD cameras nor to the application of specific deflecting arrangements such as mirrors or prisms.

What is claimed is:

1. An arrangement for the electronic acquisition of an X-ray picture from a converter for converting X-ray beams into a visible picture display on an imaging surface, said arrangement being able to be applied in the beam path of an X-ray tube and comprising plural deflectors for deflecting respective segments of the picture displayed on the imaging surface, plural electronic camera systems for converting the picture segments reflected by the respective deflectors into electrical signals, each of said deflectors being a mirror, said mirrors being arranged in a "V" configuration in front of said imaging surface.

2. An arrangement according to claim 1, wherein each picture beam path runs between a mirror and a camera system roughly parallel to the picture on the imaging surface.

3. An arrangement according to claim 1, wherein each of the camera systems contains a CCD camera.

4. An arrangement according to claim 1, wherein the camera systems are arranged adjacent to the converter and/or to a housing containing the converter and the deflecting arrangements.

5. An arrangement according to claim 1, wherein the mirrors are arranged in such a way that the image segments slightly overlap so that no picture information is lost.

6. An arrangement for the electronic acquisition of an X-ray picture from a converter for converting X-ray beams into a visible picture display on an imaging surface, said arrangement being able to be applied in the beam path of an X-ray tube and comprising plural deflectors for deflecting respective segments of the picture displayed on the imaging surface, plural electronic camera systems for converting the picture segments reelected by the respective deflectors into electrical signals, each of said deflectors being a prism, said prisms having respective reflecting surfaces arranged in a "V" configuration in front of said imaging surface.

7. A method for the electronic acquisition of a visible picture produced by X-ray beams on an imaging surface of an X-ray converter, said method comprising steps of deflecting light beams emitted from the surface of the X-ray converter in directions roughly parallel to the surface of the converter by means of two mirrors arranged in a "V" configuration in front of the imaging surface, whereby the deflecting arrangements essentially acquire segments of the picture which are different from one another, and acquiring the deflected light beams by a camera system and converting them into electrical signals.

* * * * *